United States Patent [19]
Kirsch et al.

[11] Patent Number: 5,907,384
[45] Date of Patent: May 25, 1999

[54] SECONDARY EYEGLASSES WHICH ARE INTENDED FOR ATTACHMENT TO A PAIR OF PRIMARY GLASSES

[76] Inventors: Sam Anthony Kirsch, 1941—45 Street, S.W., Calgary, Alberta, Canada, T3E 3S6; Olaf James Linnartz, #17 Erin Meadow Close, S.E., Calgary, Alberta, Canada, T2B 3E4

[21] Appl. No.: 08/984,819

[22] Filed: Dec. 4, 1997

[51] Int. Cl.⁶ .............................. G02C 9/00; G02C 7/08
[52] U.S. Cl. ................................ 351/48; 351/47; 351/57; 351/58
[58] Field of Search .................... 351/47, 57, 48, 351/58, 41, 158, 44

[56] References Cited

U.S. PATENT DOCUMENTS

| | | | |
|---|---|---|---|
| 2,842,029 | 7/1958 | Roth | 351/47 |
| 5,017,001 | 5/1991 | Kooketsu | 351/47 |
| 5,696,571 | 12/1997 | Spencer et al. | 351/47 |

FOREIGN PATENT DOCUMENTS

24144113A1  5/1992  Germany .

*Primary Examiner*—Hung Xuan Dang
*Attorney, Agent, or Firm*—Davis and Bujold

[57] ABSTRACT

Secondary eyeglasses which are intended for attachment to a pair of primary eyeglasses. The secondary eyeglasses include a campanulate lens mounting strip having an arch-like upper portion, two outwardly extending lower leg portions, an upper surface and a lower surface. Hooks are provided on the upper portion for detachably securing the lens mounting strip to a nose bridge of a pair of primary eyeglasses. Hooks are provided on each of the lower leg portions for detachably securing the lens mounting strip to a frame front of a pair of primary eyeglasses. Secondary lenses are positioned on the upper surface of each of the lower leg portions of the lens mounting strip.

4 Claims, 2 Drawing Sheets

SECONDARY EYEGLASSES WHICH ARE INTENDED FOR ATTACHMENT TO A PAIR OF PRIMARY GLASSES

FIELD OF THE INVENTION

The present invention relates to secondary eyeglasses which are intended for attachment to a pair of primary eyeglasses in front of the eyeglass lenses and in particular, secondary glasses used as sunglasses or for near vision correction.

BACKGROUND OF THE INVENTION

With advancing age, the visual acuity of a person decreases. A large proportion of persons over the age of 50 years of age require corrective lenses for both distance vision and near vision. They are equipped with bi-focals, tri-focals, or progressive lenses. A bi-focal lens has an upper distance vision correction combined with a lower near vision correction. A tri-focal lens, in addition to an upper distance vision correction and a lower near vision correction, has an intermediate vision correction. A progressive lens is a one piece multi-focal lens with a relatively smooth transition of correction from distance vision through to near vision.

In situations requiring distance vision correction, if the wearer is forced to look down through the lower near vision correction portion of the lens problems can be experienced. A person descending stairs does not have a clear view through the lower near vision correction portion of the lens. A person engaged in the game of golf does not have a clear view of the golf ball through the lower near vision correction portion of the lens. A person driving an automobile does not have a clear view of the speedometer through the lower near vision correction portion of the lens.

In view of these inherent difficulties, many persons prefer to wear ordinary distance lenses while engaged in activities where the bi-focal, tri-focal or progressive lenses interfere with the conduct and enjoyment of the activity. Unfortunately, the need for near vision correction still exists requiring such a person to carry on his or her person a near vision corrective lens for use as required. By way of example, when the golfer stops for lunch, near vision correction is required in order to read the menu. The person can either carry a second pair of glasses or can use a lens which is detachably secured to a front of a pair of eyeglasses in front of an eyeglass lens. An example of such a lens is U.S. Pat. No. 5,017,001 which issued to Kooketsu in 1991. Unfortunately, the Kooketsu lens is suitable for use as sunglasses, but is not particularly adapted for use as a near vision correction lens.

SUMMARY OF THE INVENTION

What is required is an alternative form of secondary eyeglasses which are intended for attachment to a pair of primary eyeglasses.

According to the present invention there is provided secondary eyeglasses which are intended for attachment to a pair of primary eyeglasses. The secondary eyeglasses include a campanulate lens mounting strip having an arch-like upper portion, two outwardly extending lower leg portions, an upper surface and a lower surface. Means is provided on the upper portion for detachably securing the lens mounting strip to a nose bridge of a pair of primary eyeglasses. Means is provided on each of the lower leg portions for detachably securing the lens mounting strip to a frame front of a pair of primary eyeglasses. Means is provided for mounting a lens to the upper surface of each of the lower leg portions of the lens mounting strip.

The secondary eyeglasses, as described above, are intended to be used in combination with a pair of primary eyeglasses. Such a pair of primary eyeglasses will, typically, include a frame having a front, a back, a pair of lens receiving receptacles for supporting eyeglass lenses in spaced relation and a nose bridge extending between the pair of lens receiving receptacles. A pair of primary lenses are provided with each of the primary lenses positioned in one of the pair of lens receiving receptacles. Means is provided for maintaining the position of the frame on a human head. The near vision correction eyeglasses "clip on" to the front frame of the primary eyeglasses. The upper portion of the lens mounting strip is detachably secured to the nose bridge of the pair of primary eyeglasses. Each of the lower leg portions of the lens mounting strip are detachably secured to a lower portion of the frame front of the pair of primary eyeglasses. The secondary lenses mounted to the upper surface of each of the lower leg portions of the lens mounting strip are positioned in front of the primary lenses.

The secondary glasses can be used as sunglasses, if secondary lenses of a size equal to or larger than the primary lenses in size are used. It is preferred, however, that secondary lenses are smaller than the primary lenses. When the secondary lenses are smaller than the primary lenses, the wearer retains the benefits of the prescribed spherical or astigmatic correction of his or her primary distance lenses, while being able to obtain temporary near vision correction through the secondary lenses. The secondary eyeglasses, as described above, can be provided with either prescription reading lenses or magnifier lenses. They can be quickly and easily attached to or detached from primary glasses. The secondary eyeglasses are much less expensive to manufacture than a second pair of eyeglasses.

The secondary glasses can be used by persons who have no difficulty reading but require near vision magnification in their business or recreational activities. For example, benefits can be obtained by persons engaged in activities such as jewellery repair or needlepoint. Such persons can even work with a variety of pairs of secondary glasses, each of which has varying degrees of magnification.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
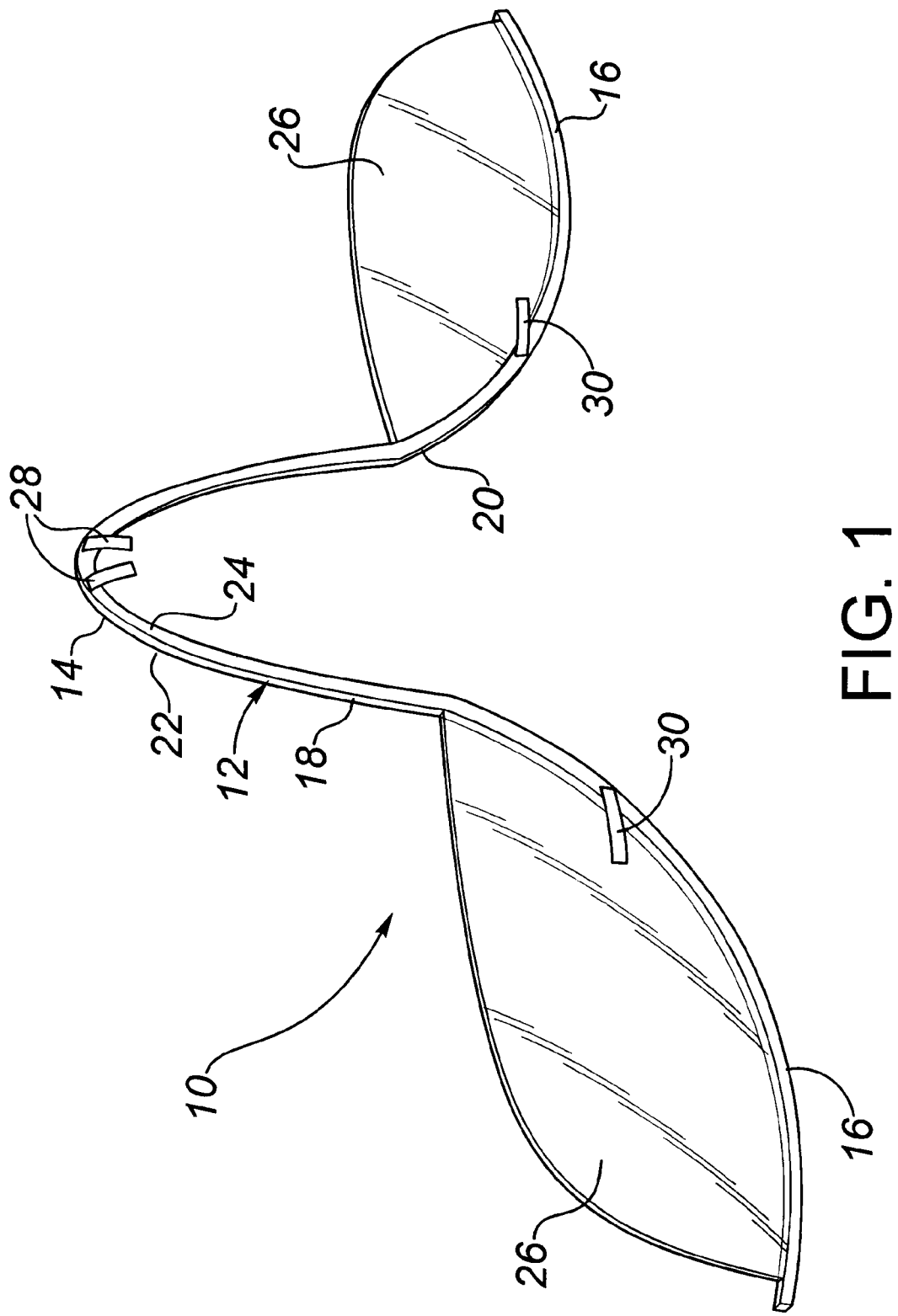
FIG. 1 is a rear perspective view of near vision correction eyeglasses constructed in accordance with the teachings of the present invention.

The preferred embodiment, secondary eyeglasses generally identified by reference numeral 10, will now be described with reference to FIGS. 1 through 3.

Referring to FIG. 1, secondary eyeglasses 10 includes a campanulate or generally bell shaped spring-like lens mounting strip 12. Lens mounting strip 12 has an arch-like upper portion 14 and two outwardly extending lower leg portions 16. Lens mounting strip 12 has an upper surface 18, a lower surface 20, a front face 22 and a rear face 24. A secondary lens 26 is mounted to upper surface 18 of each of lower leg portions 16 of lens mounting strip 12. A pair of hooks 28 are attached to and extend laterally from upper portion 14. A hook 30 is attached to and extends laterally from each of lower leg portions 16. Each of hooks 30 are directed generally back toward one of secondary lenses 26.

Figure 2:
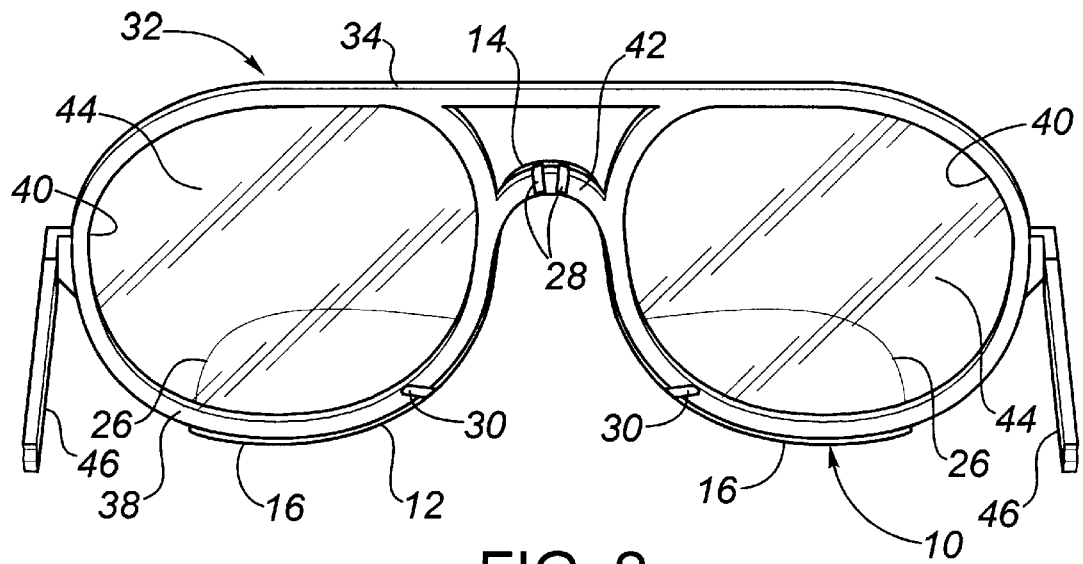
FIG. 2 is a rear perspective view of the near vision correction eyeglasses illustrated in FIG. 1, detachably secured to a conventional pair of eyeglasses.
Figure 3:
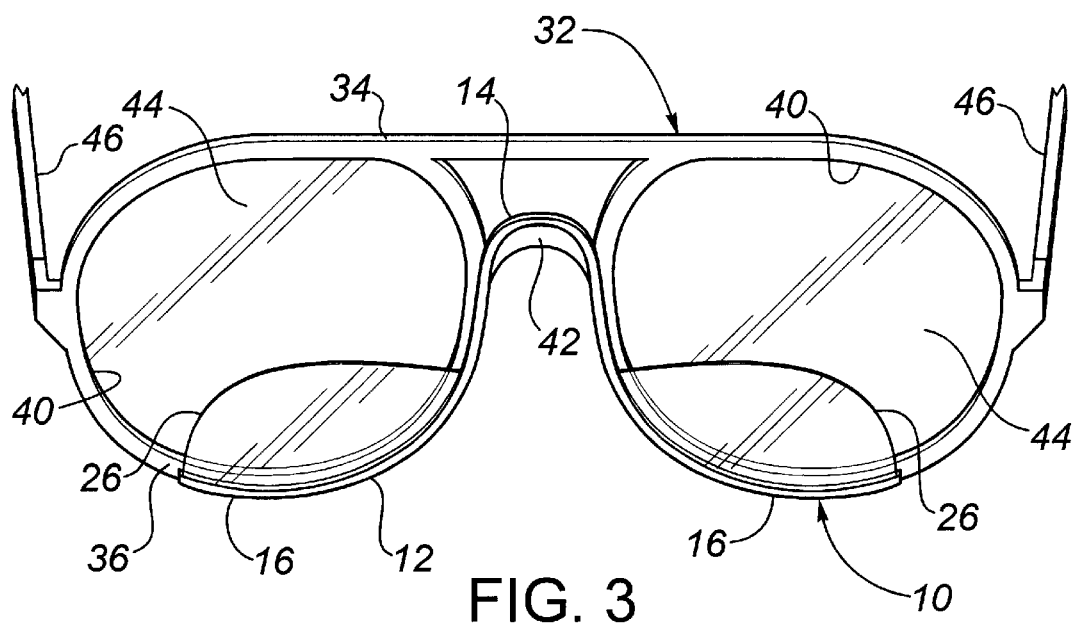
FIG. 3 is front elevation view of the near vision correction eyeglasses attached to the conventional pair of eyeglasses, as illustrated in FIG. 2.

Referring to FIGS. 2 and 3, secondary eyeglasses 10, as described above, are intended to be attached to a pair of primary eyeglasses 32. Primary eyeglasses 32 include a frame 34 having a front 36, a back 38, a pair of lens receiving receptacles 40 in spaced relation and a nose bridge 42 extending between pair of lens receiving receptacles 40. A pair of primary lenses 44 are provided with each of primary lenses 44 being positioned in one of pair of lens receiving receptacles 40. In the illustrated embodiment, support arms 46 are provided as means for maintaining the position of frame 34 on a human head (not shown). It will be appreciated that there are other means that could be used, such as expandable bands.

In order to detachably secure secondary eyeglasses 10 to primary eyeglasses 32, lens mounting strip 12 is suspended by hooks 28 on upper portion 14 from nose bridge 42 of primary eyeglasses 32. The biasing force of lens mounting strip 12 maintains hooks 30 on each of lower leg portions 16 engaged with front 36 of frame 34 on primary eyeglasses 32.

It will be apparent to one skilled in the art that modifications may be made to the illustrated embodiment without departing from the spirit and scope of the invention as hereinafter defined in the Claims.

What is claimed is:

1. Secondary eyeglasses intended for attachment to a pair of primary eyeglasses, comprising:

a campanulate spring lens mounting strip having an upper arch portion, two outwardly extending lower leg portions, an upper surface and a lower surface;

at least one hook on the upper portion whereby the lens mounting strip is suspended from a nose bridge of a pair of primary eyeglasses;

an outwardly directed hook on each of the lower leg portions for detachably securing the lens mounting strip to a frame front of a pair of primary eyeglasses, such that a biasing force exerted by the campanulate spring lens mounting strip forces the lower leg portions outwardly to maintain each hook engaged with the frame front of the pair of primary eyeglasses; and a secondary lens mounted to the upper surface of each of the lower leg portions of the lens mounting strip.

2. Secondary eyeglasses which are intended for attachment to a pair of primary eyeglasses, comprising:

a campanulate spring lens mounting strip having an upper arch portion, two outwardly extending lower leg portions, and upper surface and a lower surface, a lens being mounted to the upper surface of each of the lower leg portions of the lens mounting strip;

at least one hook on the upper portion whereby the lens mounting strip is suspended from a nose bridge of a pair of primary eyeglasses; and at least one outwardly directed hook on each of the lower leg portions, the hooks being directed toward the lens, such that the biasing force of the lens mounting strip maintains forces the lower leg portions outwardly to maintain the at least one hook on each of the lower leg portions engaged with a lower frame front of the pair of primary eyeglasses.

3. A pair of primary eyeglasses, comprising:

a frame having a front, a back, a pair of lens receiving receptacles for supporting eyeglass lenses in spaced relation and a nose bridge extending between the pair of lens receiving receptacles;

a pair of primary lenses, each of the primary lenses being positioned in one of the pair of lens receiving receptacles;

means for maintaining the position of the frame on a human head; and a pair of secondary eyeglasses, comprising:

a campanulate spring lens mounting strip having an upper arch portion, two outwardly extending lower leg potions, and upper surface and a lower surface;

the upper portion of the lens mounting strip being detachably secured to the nose bridge of the pair of primary eyeglasses;

each of the lower leg portions of the lens mounting strip having and outwardly directed hook and being detachably secured to ta lower portion of the frame front of the pari of primary eyeglasses by a biasing force exerted by the campanulate spring lens mounting strip forcing the leg portions outwardly to maintain each hook engaged with the frame front of the pari of primary eyeglasses; and a secondary lens mounted to the upper surface of each of the lower leg portions of the lens mounting strip, each of the secondary lenses being positioned in front of one of the primary lenses.

4. The combination as defined in claim 3, wherein the secondary lenses are smaller than the primary lenses.

* * * * *